Oct. 21, 1924.
R. W. ATKINSON
1,512,443
ELECTRICAL CABLE INSTALLATION
Filed May 18, 1923
FIG. I.
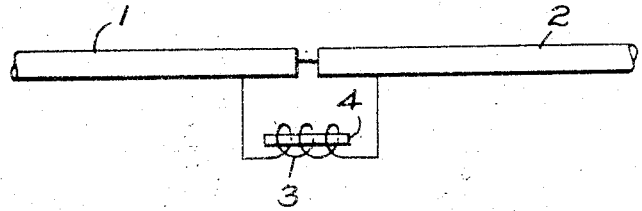
FIG. II.            FIG. III.
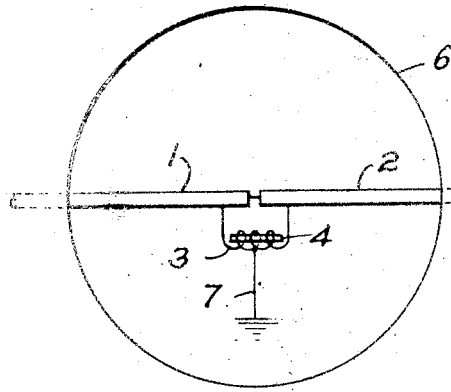 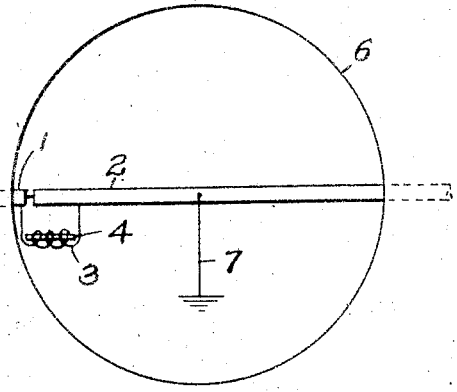
FIG. IV.
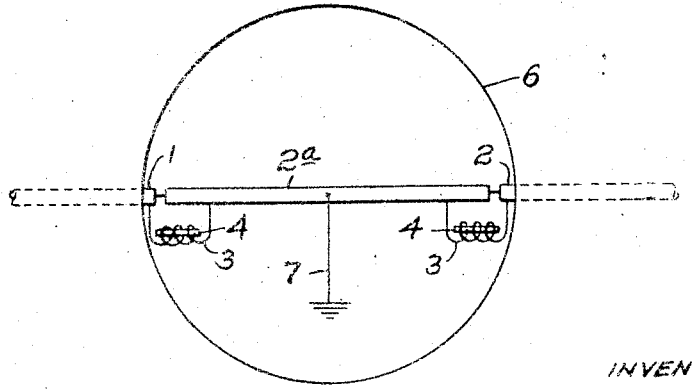
WITNESSES
J. Heleh Bradley.
Harry E. Vandersyde.
INVENTOR
Ralph W. Atkinson
by Christy and Christy
his attorneys Patented Oct. 21, 1924.

1,512,443

UNITED STATES PATENT OFFICE.

RALPH W. ATKINSON, OF PERTH AMBOY, NEW JERSEY, ASSIGNOR TO STANDARD UNDERGROUND CABLE COMPANY, OF PITTSBURGH, PENNSYLVANIA, A CORPORATION OF PENNSYLVANIA.

ELECTRICAL CABLE INSTALLATION.

Application filed May 18, 1923. Serial No. 639,825.

*To all whom it may concern:*

Be it known that I, RALPH W. ATKINSON, residing at Perth Amboy, in the county of Middlesex and State of New Jersey, a citizen of the United States, have invented or discovered certain new and useful Improvements in Electrical Cable Installations, of which improvements the following is a specification.

My invention relates to improvements in electrical cable installations, and particularly to installations of single-conductor cables for carrying high voltages. The object is to overcome the dangers and difficulties incident to and consequent upon electrical conditions induced in the lead sheath.

In the accompanying drawings Fig. I is a diagrammatic view, illustrating the apparatus in the practice of which according to the ensuing specification my invention is realized. Figs. II, III, and IV, differing one from another in particular arrangement, show diagrammatically the invention in its application to service conditions. These figures also show an elaboration upon the fundamental inventive thought, as presently I shall explain.

A metal sheath is an all but indispensable feature of a cable built for installation underground, and practically the sheath is made of lead, modified sometimes in physical characteristics by alloying, in a manner well known to the industry.

In high-voltage alternating-current work, the single-conductor structure is capable of service at voltages beyond the capability of the multiple-conductor structure; for example, for a given outside diameter, about twice as high a voltage can be employed with single conductor cables as with three-conductor cables.

In single-conductor installations the effects of induction upon the cable sheath become a difficulty with which the cable engineer has to deal, and this is a difficulty which does not exist to any considerable degree in dealing with a multiple-conductor cable. In a multiple-conductor cable installation, always there is an equipoise of electrical induction; the sum of the oppositely flowing current components is at any instant zero; and therefore there is no such inductive effect upon the cable sheath as requires to be reckoned with. Practically, there is no inductive effect. But in a single-conductor cable installation there is no such neutralization, the effects of induction are actual and substantial; voltage is built up in the cable sheath; and this induced voltage becomes a serious factor with which the engineer has to reckon.

If the lead sheath of a single conductor cable be isolated, so that electrically considered it is merely an elongate conductor in which voltage is induced, it is, in service, a delicate and vulnerable feature of the installation. For instance, if in consequence of a short circuit on some part of the line, there be a sudden rush of current through the conductor, a sudden and great increment in voltage will be induced along the sheath, so great that an electrical discharge may take place between the sheath and ground, or between the sheath of the cable and that of an adjacent cable in either of which cases there is liable to be a hole burned in the lead sheath and that means eventual ruin of the cable, consequent disturbance of service, and costly replacement. This isolation of the sheath, just described, is in practical use, but because of the great and serious dangers alluded to, it is customary in single-conductor cable installations to ground the sheath at its ends, and commonly also, at intermediate points. Thus, instead of being an isolated length of conducting material, the sheath becomes a closed circuit, and, under the influence of induction, a current flows in the circuit. There is then no localized accumulation of voltage, but instead energy is continually expended and continually dissipated in the form of heat. This loss of energy has commonly been regarded as unavoidable, and engineers have in ordinary installations of single-conductor cables come to look upon such loss of energy as a necessary incident, and have counted upon it and made allowances accordingly. They have expected that in a given installation a certain and calculable percentage of the energy generated must be so lost in transmission. These losses are essentially a cause of reduction in efficiency of transmission, and in some cases cause so great a reduction in current carrying capacity as to make the use of single-conductor cables economically impossible.

It has already been proposed to effect a compromise between the isolated straightaway length of sheath, with its liability to dangerous over-voltages, and the sheath connected to form a closed and grounded circuit, with its necessary attendant energy losses, and the proposal has been to connect the sheath in a closed and grounded circuit, and at the same time to divide the length of sheath into sections, isolated section from section by rings of insulation, and to bridge the rings of insulation with resistance coils, or perhaps with reactance coils. The proposal is a compromise: the danger of electrical discharge is diminished, but not eliminated, and the operating loss is diminished, but not eliminated. Serious difficulties still remain. A resistance so introduced necessarily under service conditions becomes heated, and the heat so generated is a difficulty in the way of practical adoption of the proposal; and even though a reactance coil be used, rather than a resistance coil, still this arrangement is at best a compromise. If sufficient reactance is used to limit the current to low values, dangerously high voltages may develop at time of abnormal conditions. On the other hand, if the reactance is so low as to make abnormal over-voltages improbable, then the current which will flow under normal conditions will be large and in general objectionable.

My invention is a further step in the direction of the advance already made, and a step which carries the art beyond a mere proposal to an actual achievement. In practicing my invention I connect the sheath in closed and grounded circuit, I subdivide the length of sheath and separate the length into isolated sections by interposed rings of insulation, and I bridge the rings of insulation. But, instead of bridging the rings of insulation by mere resistance coils or reactance coils, I bridge them by reactance coils within which extend iron cores, and these bridge elements which I employ I preferably so particularly proportion that under normal conditions of intended service the iron cores shall approach magnetic saturation. The peculiarity of this structure, adapting it to the conditions to which I apply it, is that normally it keeps induction losses small, practically as small as may be desirable, and under abnormal conditions it allows the passage of large current flow and prevents and nullifies the dangerous conditions of overvoltage which otherwise would come about. It acts analogously to a safety valve, opening automatically under excessive pressure.

Referring first to Fig. I of the drawings, a length of single-conductor cable is here diagrammatically illustrated, whose sheath is subdivided into discontinuous sections, 1 and 2. The gap between the two sections is bridged by the reactance 3, within whose coil a soft iron core 4 is arranged. And, as has just been said, the parts will be understood to be so proportioned, that under normal conditions of intended service, the core 4 is in a condition approaching magnetic saturation. Under this condition, the current which will flow through the coil, from sheath to sheath, is a fraction of what would flow if there were continuity of the sheath between the points connected by the coil. The peculiarity of the coil so constructed and proportioned as outlined previously lies in the fact that only a very small current will flow through the coil for low voltages, but that when the saturation point of the iron has been reached, further increase in voltage results in very large increases in current. Conversely, only a limited voltage can exist across the coil even where very large currents are passed through it. Now, the voltage which would be induced in the sheath of such a cable would be proportional to the current flowing in the conductor, if the voltage is not allowed to expend itself in producing current flow through the sheath. In normal operation of the cable, the relatively low voltage induced by the normal current in the cable is relatively unobjectionable and the energy loss which would occur if the current were permitted to flow would be objectionable. On the contrary, however, there are occasions where the current flowing in the conductor is, for very short periods, abnormally large, oftentimes tens of time greater than the normal current and, under this condition, the proportionately greater voltage would be seriously objectionable. Furthermore, the energy loss which would occur by permitting the current to flow in the sheath and thus short circuit the voltage, is unobjectionable because the duration is not such as to produce objectionable heating. Thus, the characteristics of the coil above described are ideal for the purpose, inasmuch as when the current in the conductor is abnormally large and the induced voltage would be correspondingly great, current is permitted to flow in the sheath at only a slight increase in voltage, the amount of current flowing being sufficient to absorb in the resistance and reactance of the sheath, the excess voltage.

Turning now to Figs. II, III and IV, a cable is here diagrammatically shown, passing across the space within a man-hole. The man-hole in indicated, as though seen in plan, by a circle 6. The cable sheath is in its continuity broken and the apparatus in which my invention resides, bridges the break.

In any such installation, involving a considerable extent of cable, perhaps several miles, it is not sufficient to ground the ends merely; the cable sheath is grounded at successive points and at relatively frequent intervals, throughout its length. Ordinarily it is grounded at the man-holes, where separately built lengths are united to form the continuous conducting element of the installation. In Figs. II, III, and IV, I show various arrangements in the break in sheath continuity, bridged by the apparatus already described, in association with grounding at particular points, to afford protection both to the cable structure, preventing breakdown, and to a workman within the man-hole.

According to Fig. II the grounding 7 is made at the mid-point of the reactance coil 3. This grounding at the mid-point has a certain advantage over the possible alternate of grounding at one end or the other, say for illustration grounding the sheath section 2. In the latter case, the voltage to ground from end 1 is the full amount of the voltage induced between 1 and 2, the voltage across the reactance coil. In case the reactance coil is grounded at the mid-point, the same voltage exists between 1 and 2 as before, but the voltage to ground from either 1 or 2 is only one half of this, which is an advantage of material importance.

Figure III shows the sheath section 2 grounded at one side of the break, but here the break is carried to one side, and brought near to the wall of the man-hole, so that the only place where a potential dangerous to the workman can be built up is at the end of section 1, and it by virtue of position is not exposed to the easy accidental contact of a workman's body. Here the sheath is not maintained at ground potential by the direct connection to a grounded lead, but by the particular arrangement described the workman is adequately protected from injury.

In Fig. IV two breaks are formed in the cable sheath and they are arranged adjacent opposite walls of the man-hole space, as the drawing indicates. The intermediate sheath section 2ª is grounded. Here the man-hole is made safe for the workman, and, additionally any difference of voltage that may come about between the ends of sheath sections 1 and 2 is, as in the case of Figure II, immediately related to ground, and the strain tending to cable injury is in its effective value cut in half.

The sheaths of the cable within the man-hole should properly be connected to all metal parts of the man-hole fittings; and, in extreme cases, the man-hole walls and floor could be made to constitute part of the ground connection by the use of metal plates or "metal lath," covered with cement, and connected to the other metal parts.

The invention has been developed in the application described, the application to a high-tension, single-conductor, lead-sheathed cable. Manifestly it is applicable wherever the condition described obtains.

I claim as my invention:

1. In an electrical cable installation a metal-sheathed cable whose sheath in discontinuous lengths is connected to a closed and grounded circuit through an automatically variable reactance element.

2. In an electrical cable installation the combination with a metal sheathed cable whose sheath is broken in continuity, of an automatically variable reactance element bridging such break in continuity, such reactance element including a coil and a soft iron core arranged within the coil, the cable sheath being connected through said reactance element in a closed and grounded circuit.

3. A single-conductor lead-sheathed cable adapted to high-tension service the lead sheath being subdivided into discontinuous sections and the spaces between the sections being bridged and the sections connected in series through reactance coils with iron cores arranged within them, such bridging elements being so proportioned that under normal conditions of intended service the core members shall approach magnetic saturation, the sheath sections so serially united being connected in a closed and grounded circuit.

4. In an electrical cable installation the combination with a metal sheathed cable the continuity of whose sheath is broken, of an automatically variable impedance element including a reactance coil bridging the break in sheath continuity, said reactance coil being at an intermediate point in its extent grounded, the sheath being connected through such impedance element in a closed circuit.

5. In an electrical cable installation a metal-sheathed cable extending across a man-hole, a break in the continuity of the cable sheath within the man-hole and adjacent the wall thereof, a reactance coil bridging such break, and connection to ground within the man-hole, the arrangement being such that the sheath section which protrudes to less distance within the man-hole has connection to ground through said reactance coil.

6. In an electrical cable installation a metal-sheathed cable extending across a man-hole, breaks in the continuity of the cable sheath within the man-hole and adjacent to the two points where the cable penetrates the wall thereof, impedance devices bridging the two breaks, and connection to ground within the manhole leading from a point intermediate the two sheath sections which penetrate the manhole wall.

In testimony whereof I have hereunto set my hand.

RALPH W. ATKINSON.

Witnesses:
 LESLIE D. KUHN,
 KENNETH P. LIND.